Patented July 25, 1944

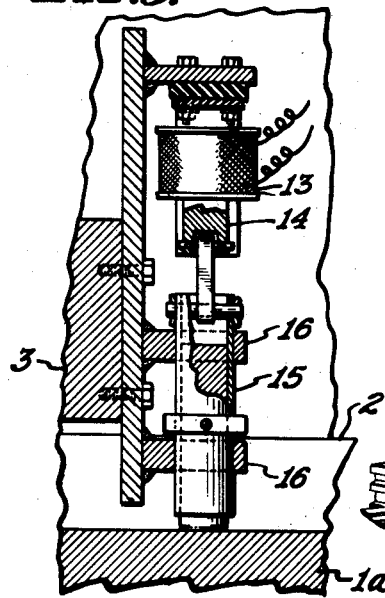
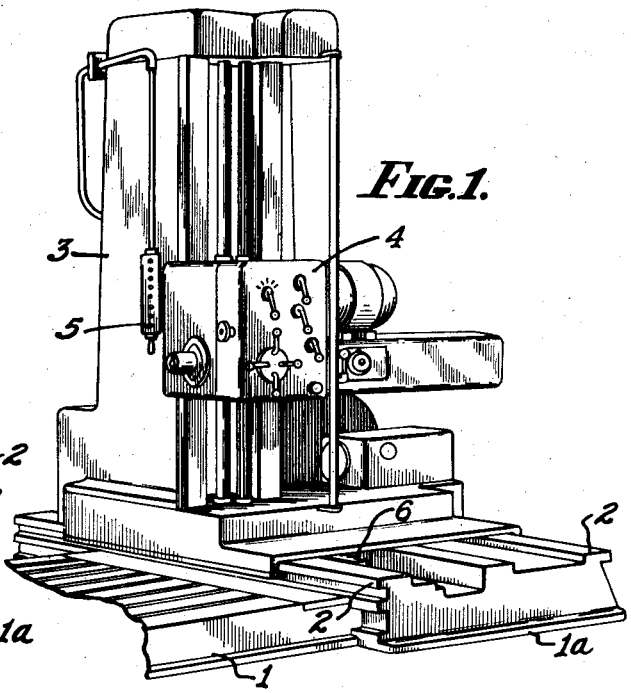
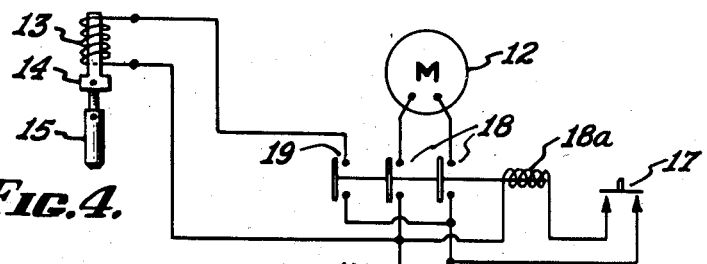
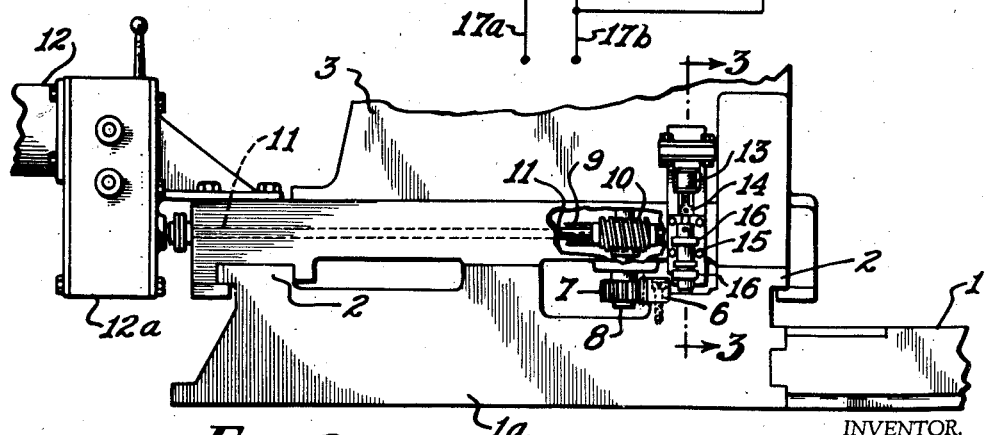

2,354,413

UNITED STATES PATENT OFFICE 2,354,413

MICROFEED FOR HEAVY MACHINE TOOLS

John M. Walter, Cincinnati, Ohio, assignor to The G. A. Gray Company, Cincinnati, Ohio, a corporation of Ohio Application April 21, 1942, Serial No. 439,866

4 Claims. (Cl. 74—1)

In the operation of heavy machine tools where it is necessary to move heavy parts with very fine adjustment to positions for performing work in drilling, milling, planing and the like, the mass of the parts to be moved become such that even with ample power available, there is a lag and jump movement which interferes with extreme accuracy in moving such parts to a definite position.

In the instance hereinafter illustrated which is a horizontal type machine for boring, drilling and machining, the large and heavy housing which carries the motors, gear boxes, tool carrying shafts, adjustable side heads and the like, is itself movable along the bed of the machine on ways, and has a worm drive from a motor to a gear and rack for moving the housing. The usual manner of moving such a large housing is to "inch" it along as it approaches final position by momentarily closing the motor circuit and repeating as often as necessary to bring the housing to the required position. However, the weight of the housing on the ways which in the illustrated example runs to around 45,000 pounds is such that it will resist movement and then give way, so that the total increment of movement is not subject to close control. Thus a skillful operator finds it difficult to move such a head to a position which is within .01 inch of the required one.

With my invention the same heavy head can be located by moving it along on the ways to within .0001 inch.

A like problem is encountered in moving the table in a table type milling machine, or the wheel in heavy grinders, in heavy lathes to make microadjustments in the tool carriage, and in large jig borers for moving the table with the work. These instances are mentioned without intent to limit the application of my invention, which I will explain by the one example of the horizontal type boring, drilling and milling machines.

In the drawing—

Figure 1 is a perspective of the main housing or column and part of the work table in such a machine.

Figure 2 is a rear view of the housing and ways, broken away to show the structure of my invention as applied to this particular machine.

Figure 3 is a vertical section, partly in elevation on the line 3—3 of Figure 2.

Figure 4 is a diagram showing the wiring for the particular structure.

In the illustrated example, I show a part of a work supporting table 1 to which the work piece may be clamped in any desired manner. A base member 1a is provided with ways 2 for a vertical housing 3, which carries a side head 4 suitably mounted for vertical movement on the housing. At the side of the housing I have illustrated a pendant switch button panel 5.

My invention is directed to means for assuring that the housing can be moved along the ways to very precise positions in spite of its great weight, which precise movement is accomplished by a special microadjustment switch button rather than a regular traverse switch button.

As a drive for the housing I have shown a rack 6 mounted on the base 1a. A gear 7 meshing with this rack, is mounted on a shaft 8 driven by a worm gear 9. The worm gear 9 (not clearly shown) is driven by a worm 10 on a shaft 11, which shaft at its outer end is driven by a motor 12 operating through a gear box 12a. This structure is standard in type and not in its details a part of my invention.

Located on the housing is a solenoid 13 with an armature 14 which is raised and dropped by the solenoid. This armature has linked thereto a weight 15, that slides in suitable brackets 16 on the housing. In the example, the weight is of around ten pounds and the parts are so located that when it is dropped it strikes against the body of the ways on which the housing must move, serving thus as a hammer.

Referring to Figure 4, the numeral 17 indicates the microadjustment switch or push button station of the pendant switch 5. When the circuit controlled by this switch is closed the current from the main lines 17a and 17b flows through a coil 18a to actuate and close a switch 18 to the motor 12, which motor supplies the drive for the housing operating worm. Another contact member 19 is also simultaneously closed by action of the coil 18a, the member 19 closing a circuit to the solenoid 13 causing it to draw up its armature 14 and the hammer 15. The switches 18 and 19 stay closed only as long as the push button 17 is held in contact position. As has already been noted, the mode of causing one of these heavy machine tool parts to move when approaching its final position is to inch it along by punching the switch, letting it open, and punching it again, until the desired position for the part is reached. When this is done the hammer or weight is raised when the motor circuit is closed, and dropped when it is opened again which taps against the ways, and even though total movement of the hammer in the example described is only about one inch in amplitude, the jar thus created causes a vibration of the surfaces of the ways, of extremely small amplitude, but sufficient to relieve the static friction existing between the housing and ways, thus eliminating the jump action described and permitting a very close adjustment.

The operation is such that the drive motor when it is momentarily set in motion stores energy in the transmission to the heavy part, but the lag due to friction does not release the part for movement until the blow is struck. Thus the blow is timed to occur during the movement although not at the instant of applying energy.

It is to be pointed out that the location of the hammer or the region of application of the taps or blows struck thereby is not of critical value, for I have found that results beneficial to microadjustment of the members will be obtained by striking or tapping upon any region of either member. The location of the hammer in the example illustrated was chosen for convenience in construction.

Application of my invention to other feeds will be obvious from the above to the machine tool builder, the point being to provide a means for striking relatively slight blows as between the support and the member to be moved, during the process of moving it up to final position, more particularly when inching it to such position as by a microadjustment switch often used in heavy machine tools. Other means for striking the relatively moving parts or one of them or setting up a momentary vibration of even very slight amplitude during the application of power will permit of the microadjustment. While in the example I have described an operation in which the precise timing of the hammer blow is just at the instant that the motor begins to slow down, this as last above noted is not a necessity of the operation, since in an operation of inching a heavy member to accurate position, the necessity is to free the parts for movement coincident with the setting up of stress in the motion transmitting members, and the lag between power impulses and imparted movement is thus eliminated as a source of inaccuracy.

Having thus described my invention, what I claim as new and desire to secure by Letters Patent is:

1. In a machine tool having an adjustable heavy moving part, and a housing having ways on which the part moves, a rack and gear drive for moving the part on the ways, a solenoid and a hammer operated thereby mounted on the housing and arranged so that the hammer strikes the body of the ways, a motor for driving the gear, said solenoid being in circuit with the motor so as to raise the hammer when the motor is energized and drop it when the motor is deenergized.

2. In a machine tool having an adjustable heavy moving part, and a housing having ways on which the part moves, a rack and gear drive for moving the part on the ways, a solenoid and a hammer operated thereby mounted on the housing and arranged so that the hammer strikes the body of the ways, a motor for driving the gear, said solenoid being in circuit with the motor so as to raise the hammer when the motor is energized and drop it when the motor is deenergized, and a microadjustment switch for momentarily closing circuit to the motor and solenoid.

3. In a machine tool, a support member, a heavy member movable on said support member to required positions of accurate adjustment, a source of power and mechanical transmission therefrom so mounted and connected as to drive the heavy member along the support member, means for momentarily supplying energy to the power source thus placing the transmission under stress, and means arranged to be supplied with energy along with the power source and adapted to strike against one of the two members, thus supplying mechanical vibration to one of said members, the said means so constructed as to supply said vibration after stress has been set up in the said transmission.

4. The combination of claim 3 in which the source of power is an electric motor, and the means to strike one of the members is a solenoid operated hammer.

JOHN M. WALTER.